United States Patent
Foley et al.

(10) Patent No.: US 10,146,646 B1
(45) Date of Patent: Dec. 4, 2018

(54) SYNCHRONIZING RAID CONFIGURATION CHANGES ACROSS STORAGE PROCESSORS

(71) Applicant: EMC IP Holding Company LLC, Hopkinton, MA (US)

(72) Inventors: Robert P. Foley, Clinton, MA (US); Peter Puhov, Shrewsbury, MA (US); Socheavy Heng, Cranston, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 15/498,847

(22) Filed: Apr. 27, 2017

(51) Int. Cl.
G06F 11/00 (2006.01)
G06F 11/16 (2006.01)
G06F 11/20 (2006.01)
G06F 3/06 (2006.01)

(52) U.S. Cl.
CPC ........ *G06F 11/1662* (2013.01); *G06F 3/0619* (2013.01); *G06F 3/0665* (2013.01); *G06F 3/0689* (2013.01); *G06F 11/2094* (2013.01); *G06F 2201/80* (2013.01); *G06F 2201/85* (2013.01)

(58) Field of Classification Search
CPC ............. G06F 11/1662; G06F 11/2094; G06F 11/1658; G06F 11/1675; G06F 11/2089; G06F 11/2092; G06F 11/3003; G06F 11/3034; G06F 11/3051; G06F 11/3055; G06F 2201/80; G06F 2201/85; G06F 3/0619; G06F 3/0665; G06F 3/0689; G06F 3/0604; G06F 3/0614; G06F 3/0617; G06F 3/0622; G06F 3/0629; G06F 3/0634; G06F 3/0644; G06F 3/0653; G06F 3/0655; G06F 3/0658; G06F 3/0683
See application file for complete search history.

(56) References Cited

U.S. PATENT DOCUMENTS

| | | | | |
|---|---|---|---|---|
| 6,058,455 A | * | 5/2000 | Islam | G06F 11/1096 710/10 |
| 7,433,300 B1 | * | 10/2008 | Bennett | G06F 11/2005 370/216 |
| 7,640,451 B2 | | 12/2009 | Meyer et al. | |
| 8,612,699 B2 | * | 12/2013 | Jain | G06F 11/1088 711/159 |
| 8,832,369 B2 | * | 9/2014 | Zhang | G06F 3/0607 711/114 |
| 9,304,699 B1 | | 4/2016 | Goudreau et al. | |

(Continued)

*Primary Examiner* — Bryce P Bonzo
*Assistant Examiner* — Anthony J Amoroso
(74) *Attorney, Agent, or Firm* — BainwoodHuang

(57) ABSTRACT

A technique for maintaining RAID (redundant array of independent disks) configuration metadata across multiple SPs (storage processors) includes receiving a change request by a controller within a first SP, writing, by the first SP, a RAID configuration change described by the change request to a persistent intent log, and informing a second SP that the intent log has been written. The second SP, upon being informed of the write to the intent log, reads the RAID configuration change from the intent log and writes the RAID configuration change to a persistent configuration database. In this manner, the first SP and the second SP both receive the RAID configuration change and thus are both equipped to service reads and writes directed to a affected RAID storage.

20 Claims, 7 Drawing Sheets

(56) References Cited

U.S. PATENT DOCUMENTS

| | | | |
|---|---|---|---|
| 9,330,103 B1 | 5/2016 | Bono et al. | |
| 9,380,114 B1 | 6/2016 | Holt et al. | |
| 2011/0320865 A1* | 12/2011 | Jain | G06F 11/1088 |
| | | | 714/6.22 |
| 2012/0054441 A1* | 3/2012 | Nakashima | G06F 11/1441 |
| | | | 711/124 |
| 2012/0110262 A1* | 5/2012 | Zhang | G06F 3/0607 |
| | | | 711/114 |
| 2017/0269857 A1* | 9/2017 | Kundu | G06F 3/0619 |

* cited by examiner

SYNCHRONIZING RAID CONFIGURATION CHANGES ACROSS STORAGE PROCESSORS

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Data storage systems commonly arrange non-volatile storage devices according to RAID protocols. As is known, RAID (redundant array of independent disks) is a technique for storing data redundantly across multiple disk drives through the use of mirroring and/or parity. RAID systems commonly arrange disk drives in RAID groups, and RAID control software automatically translates writes directed to RAID groups to redundant writes across multiple disk drives.

A storage processor in a data storage system may store configuration data for a particular RAID group. If a RAID group changes, e.g., as a result of swapping out a failed disk drive for a spare, the storage processor updates its configuration data to reflect the presence of the spare, thus ensuring that the storage processor directs reads and writes to proper disk drives going forward.

SUMMARY

Data storage systems commonly include multiple storage processors (SPs) configured in so-called "active-passive" arrangements, in which particular SPs are designated as owners of respective RAID groups. When a host issues an IO (input/output) request to access data, the SP receiving the IO request may check whether it is the owner of a target RAID group where the data are stored. If so, the receiving SP processes the IO request by itself, mapping the IO request to the particular disk drives in the target RAID group and performing the requested read or write. If not, the SP may forward the IO request to another SP, which the data storage system has designated as the owner of the target RAID group. The other SP then processes the IO request to read or write the specified data.

Some data storage systems support so-called "active-active" arrangements, in which multiple SPs can process IO requests directed to particular RAID groups. In such arrangements, it is possible for RAID configuration data to get out of sync between different storage processors. For example, one SP may receive updated RAID configuration data while another SP does not. Thus, a need arises to maintain consistency in configuration data across different SPs in an active-active arrangement.

In contrast with prior approaches, an improved technique for maintaining RAID configuration metadata across multiple SPs includes receiving a change request by a controller within a first SP, writing, by the first SP, a RAID configuration change described by the change request to a persistent intent log, and informing a second SP that the intent log has been written. The second SP, upon being informed of the write to the intent log, reads the RAID configuration change from the intent log and writes the RAID configuration change to a persistent configuration database. In this manner, the first SP and the second SP both receive the RAID configuration change and thus are both equipped to service reads and writes directed to affected RAID storage. Further, the data storage system stores the RAID configuration change in the persistent configuration database, such that the information is maintained even in the event of a power loss or system error.

In some examples, the data storage system stores the persistent configuration database in a distributed manner across multiple disk drives in the RAID storage. As the amount of RAID configuration metadata scales in proportion to the number of disk drives in the RAID system, such distributed storage keeps the amount of RAID configuration metadata stored on each disk drive approximately constant.

Certain embodiments are directed to a method of maintaining configuration data describing RAID storage across first and second SPs coupled to the RAID storage. The method includes receiving, by a first controller running on the first SP, a change request to make a change in RAID configuration metadata describing the RAID storage. In response to receiving the change request, the method further includes (i) writing, by the first SP, a configuration-change record to a persistent intent log, the configuration-change record describing the requested change in RAID configuration metadata, and (ii) informing, by the first SP, a second controller running on the second SP that the configuration-change record has been written. The method still further includes reading, by the second SP, the configuration-change record from the persistent intent log and writing, by the second SP, the configuration-change record as read from the persistent intent log to a persistent configuration database. The persistent intent log and the persistent configuration database are each stored externally to the first SP and the second SP.

Other embodiments are directed to a data storage system constructed and arranged to perform a method of maintaining configuration data describing RAID storage. Still other embodiments are directed to a computer program product. The computer program product stores instructions which, when executed on control circuitry of a data storage system, cause the data storage system to perform a method of maintaining configuration data describing RAID storage.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for maintaining consistent RAID configuration metadata across multiple SPs in an active-active arrangement includes receiving a change request by a controller within a first SP, writing a specified RAID configuration change to a persistent intent log, and informing a second SP that the intent log has been written. The second SP, upon being informed of the write to the intent log, reads the RAID configuration change from the intent log and writes it to a persistent configuration database.

Figure 1:
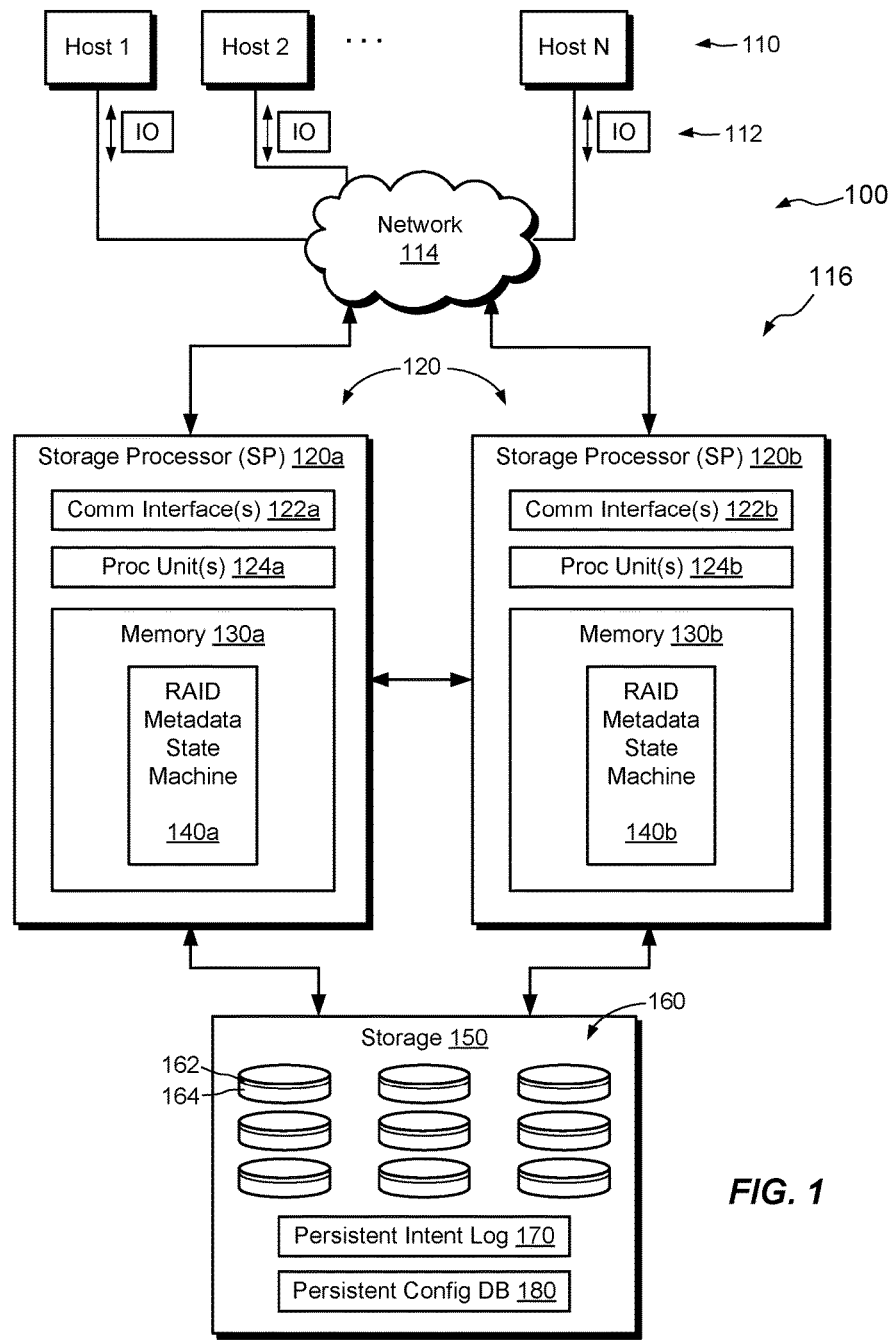
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110 connect to a data storage system 116 over a network 114. The data storage system 116 includes multiple storage processors (SPs) 120, such as a first SP 120a and a second SP 120b, and persistent storage 150. The persistent storage 150 includes multiple disk drives 160, such as magnetic disk drives, electronic flash drives, optical drives, and the like. As used herein, the terms "disk drives," "disks," and "drives" may be used interchangeably to describe persistent storage devices, regardless of whether such devices include any physical disk or any physical drive mechanism.

Some or all of the disk drives 160 are arranged according to RAID protocols, e.g., as RAID groups, as part of a fully-mapped RAID system, and/or as other RAID configurations. Each disk drive 160 has a logical block address (LBA) range, which may be divided into regions. In some examples, a first region 162 is reserved for system metadata and a second range 164 is reserved for host data. The system metadata may include contents of a persistent intent log 170 and contents of a persistent configuration database 180. The depicted persistent intent log 170 and persistent configuration database 180 are thus logical structures whose physical data are stored in a distributed manner within the regions 162. For example, each region 162 may store a portion of the persistent intent log 170 and/or a portion of the persistent configuration database 180. The regions 162 may store multiple copies of each such portion across different disk drives, e.g., to provide redundancy and fault tolerance. In some examples, the regions 162 fall outside the scope of RAID protocols that apply to host data in regions 164. For example, the data storage system 116 may manage redundant storage of system metadata in regions 162 via separate means.

The SPs 120a and 120b may be provided as circuit board assemblies, or "blades," which plug into a chassis that encloses and cools the SPs. The chassis has a backplane for interconnecting the SPs, and additional connections may be made among SPs using cables. No particular hardware configuration is required, however, as the SPs 120a and 120b may be any type of computing device capable of processing host IOs. Although two SPs 120a and 120b are shown, the data storage system 116 may include a greater number of SPs, e.g., in a clustered arrangement.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI, NFS, and CIFS, for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 according to block-based and/or file-based protocols and to respond to such IO requests 112 by reading or writing the storage 150.

Each of the SPs 120a and 120b is seen to include one or more communication interfaces 122a or 122b, a set of processing units 124a or 122b, and memory 130a or 130b. The communication interfaces 122a and 122b each include, for example, SCSI target adapters and network interface adapters for converting electronic and/or optical signals received over the network 114 to electronic form for use by the respective SP 120. The sets of processing units 124a and 124b each include one or more processing chips and/or assemblies. In a particular example, each set of processing units 124a and 124b includes numerous multi-core CPUs. Each memory 130a and 130b may include both volatile memory, e.g., random access memory (RAM), and non-volatile memory, such as one or more read-only memories (ROMs), disk drives, solid state drives, and the like. Each set of processing units 124a or 124b and respective memory 130a or 130b form respective control circuitry, which is constructed and arranged to carry out various methods and functions as described herein. Also, memories 130a and 130b each include a variety of software constructs realized in the form of executable instructions. When the executable instructions are run by the respective set of processing units, the set of processing units is caused to carry out the operations of the software constructs. Although certain software constructs are specifically shown and described, it is understood that memories 130a and 130b typically each include many other software constructs, which are not shown, such as an operating system, various applications, processes, and daemons.

As further shown in FIG. 1, memory 130a "includes," i.e., realizes by execution of software instructions, a RAID metadata state machine 140a. Likewise, memory 130b includes a RAID metadata state machine 140b. These state machines 140a and 140b operate in close coordination to maintain consistent RAID configuration metadata across the two SPs 120a and 120b. For example, any change in RAID configuration initiated by one SP is promptly synchronized with the other SP, such that both SPs have the same metadata. In this manner, each of the SPs 120a and 120b is able to respond properly to IO requests 112 from hosts 110 to effect reads and writes to underlying RAID storage. For example, each SP 120 has the RAID configuration metadata needed to map reads and writes to correct disk drives 160 in storage 150.

In an example, the RAID configuration metadata includes information about disk drives 160, particular extents within disk drives, and plans for arranging extents into RAID groups. Included among the RAID configuration metadata is identifier mapping information for particular disk drives 160. For example, each disk drive may have a globally unique identifier (GUID) as well as a system-assigned drive ID, which is unique within the data storage system 116 but not necessarily globally. The data storage system 116 assigns each drive ID as a short name or alias. Each GUID may be a 128-bit number, for example, whereas the corresponding drive ID may be only a few bits in length. Plans for arranging extents into RAID groups typically identify disk drives by drive IDs rather than GUIDs, owing to their more compact nature. The data storage system 116 typically assigns device IDs on startup, e.g., by discovering available disks and assigning a disk ID to each. In some examples, the data storage system 116 also assigns GUIDs to disk drives, e.g., based on one or more uniquely identifying or descriptive features, such as serial number, model number, capacity, and the like.

Changes in RAID configuration metadata may arise for many reasons. For instance, the data storage system 116 may replace a failing or unreliable disk drive with a spare, with the replacement requiring updates to one or more plans to reflect changes in RAID group membership. The data storage system 116 may also move disk drives between storage tiers. For example, a flash drive approaching its endurance limit may be moved from a tier of very active storage to a tier of less-active storage involving fewer writes per day. Moving the disk drive may entail changes to various plans stored in the RAID configuration metadata. Also, new disk drives may be added to a system, requiring new identifiers to be created and plans to be updated accordingly.

Figure 2:
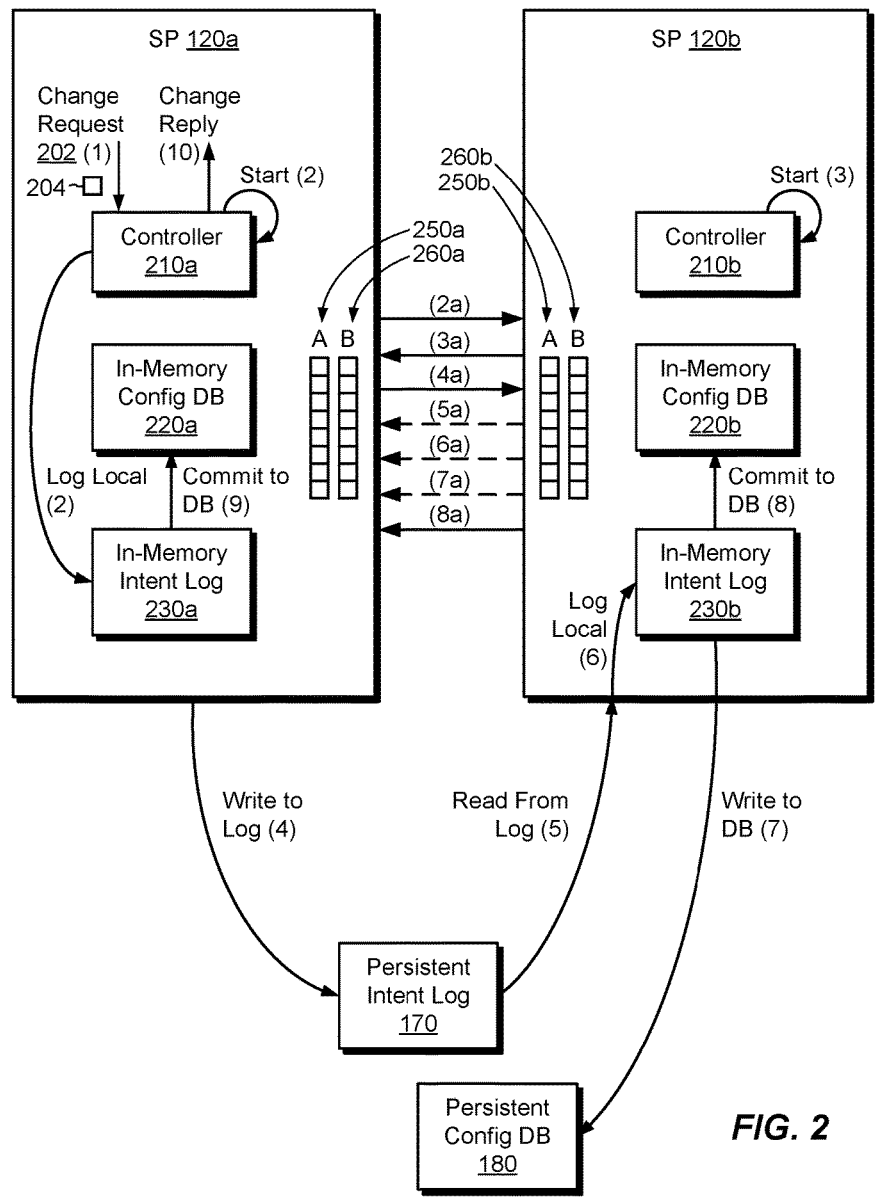
FIG. 2 is a block diagram showing an example arrangement for synchronizing changes in RAID configuration metadata across two storage processors.

FIG. 2 shows example features of SP 120a and SP 120b in further detail. Here, controller 210a on SP 120a and controller 210b on SP 120b implement state machines 140a and 140b, respectively. The controller 210a on SP 120a is configured to access in-memory configuration database 220a and in-memory intent log 230a to support operation of the state machine 140a. Likewise, controller 210b on SP 120b is configured to access in-memory configuration database 220b and in-memory intent log 230b to support operation of the state machine 140b. Flags 250a in SP 120a store state information of state machine 140a, e.g., with each flag designating completion of a respective action by state machine 140a. Flags 250b on SP 120b are configured to store a mirror image of flags 250a. In a similar manner, flags 260b in SP 120b store state information of state machine 140b, e.g., with each flag designating completion of a respective action by state machine 140b. Flags 260a in SP 120a are configured to store a mirror image of flags 260b. The illustrated constructs 210a, 220a, 230a, 250a, and 260a all reside within the memory 130a of SP 120a. Likewise, the illustrated constructs 210b, 220b, 230b, 250b, and 260b all reside within the memory 130b of SP 120b.

The numbered acts shown in parentheses depict an example sequence of operation. At (1), controller 210a in SP 120a receives a change request 202 to update RAID configuration metadata as specified in a configuration-change record 204. The change request 202 may arrive from a client operating within SP 120a or from an external client, such as a host or administrator. In an example, the configuration-change record 204 designates a desired metadata state that reflects the requested configuration change, i.e., the metadata that should be in place after the configuration change is implemented to properly reflect a new configuration.

At (2), the controller 210a starts the state machine 140a. This act may include starting one or more software threads, initializing variables, instantiating software objects, and so forth, to support operation of state machine 140a. Also at (2), the controller 210a writes the configuration-change record 204 to the in-memory intent log 230a.

At (2a), under direction of controller 210a, SP 120a notifies SP 120b that the state machine 140a has been started. For example, controller 210a sets a flag (one of flags 250a), which is designated to indicate completion of the start operation at (2), and SP 120a sends flags 250a to SP 120b. SP 120b receives the flags 250a, and controller 210b on SP 120b detects that controller 140a has completed the start operation at (2). As controller 210b receives all flags 250a, controller 210b can detect the precise progress of controller 210a. For example, one flag may be set to indicate completion of act (2) but other flags may be reset, indicating that the respective acts have yet to be completed (flags may be implemented as individual bits). In some examples, SP 120a sends both sets of flags 250a and 260a at (2a). Controller 210b may thus raise an error if flags 260a as received from SP 120a differ from flags 260b as stored locally.

At (3), controller 210b on SP 120b starts the state machine 140b, such as by starting threads, instantiating objects, etc., e.g., in the same manner as described above for SP 120a.

At (3a), under direction of controller 210b, SP 120b notifies SP 120a that the state machine 140b has been started. For example, controller 210b sets one of the flags 260b designated to indicate completion of the start operation at (3), and SP 120b sends the flags 260b to SP 120a. Controller 210a, which has been waiting for the notification at (3a), receives the flags 260b (or both sets of flags 250b and 260b).

At (4), under direction of controller 210a, SP 120a writes the configuration-change record 204 to the persistent intent log 170, i.e., the persistent version of the intent log kept in storage 150. In some examples, this act (4) involves writing the configuration-change record 204 to regions 162 on multiple disk drives 160 (FIG. 1), e.g., to ensure redundancy in the event of a disk drive failure.

At (4a), under direction of controller 210a, SP 120a notifies SP 120b that the configuration-change record 204 has been written to the persistent intent log 170, i.e., that the act (4) has been completed. In an example, act (4a) involves setting another one of the flags 250a and sending the flags 250a (and optionally 260a) to SP 120b.

At (5), controller 210b, which had been waiting for notification (4a), directs SP 120b to read the newly-written configuration-change record 204 from the persistent intent log 170. Optionally, the controller 210b informs SP 120a of this act at (5a), e.g., by setting another of the flags 260b and sending the flags 260b to SP 120a. This act may be regarded as optional because controller 210a on SP 120a is typically not waiting for this act (5) to occur. Rather, controller 210a is preferably waiting for a notification of more complete progress, which comes later.

At (6), controller 210b writes the configuration-change record 204 as read at (5) to the in-memory intent log 230b.

Optionally, controller 210b informs SP 120a of this act at (6a), e.g., in a manner similar to that described above.

At (7), controller 210b directs SP 120b to write the configuration-change record 204 as read at (5) to the persistent configuration database 180, i.e., the persistent version kept in storage 150. In some examples, this act (7) involves writing the configuration-change record 204 to regions 162 on multiple disk drives 160 to ensure redundancy. The controller 210b may inform SP 120a of this act at (7a).

At (8), controller 210b writes the configuration-change record 204 as stored in the in-memory intent log 230b to the in-memory configuration database 220b, thus committing the transaction locally on SP 120b.

At (8a), the controller 210b directs SP 120b to inform SP 120a that the transaction at (8) is complete, e.g., by setting a flag designated for this purpose and sending the flags 250a and 260a to the SP 120a. In an example, the act at (8a) provides controller 210a on SP 120a the notification for which it has been waiting.

At (9), controller 210a, having received the notification at (8a), writes the configuration-change record 204 as stored in the in-memory intent log 230a to the in-memory configuration database 220a, thus committing the transaction locally on SP 120a.

At (10), controller 210a issues a reply to the change request 202 received at (1), indicating that the requested metadata change has been completed successfully. If any errors occurred during the above-described acts, controller 210a might instead reply with an unsuccessful result at (10).

In the manner described, both SPs 120a and SP 120b write the configuration-change record 204 to their respective local in-memory configuration databases 230a and 230b before the change request 202 is acknowledged at (10). Thus, each SP is prepared to receive and correctly process IO requests 112, i.e., by mapping read and write requests to correct disk drives 160 in storage 150. Also, the illustrated arrangement ensures that the persistent configuration database 180 contains the configuration-change record 204 prior to acknowledging the request at (10). Thus, not only are the SPs 120a and 120b consistent with each other, but also they are consistent with the persistent version in storage 150.

Although the roles of SP 120a and SP 120b are not symmetrical in the example above, one should appreciate that either SP 120a or SP 120b may play either role. For example, if SP 120b were to receive a change request 202 instead of SP 120a, SP 120b would perform the acts as described above for SP 120a. Likewise, SP 120a would perform the acts as described above for SP 120b. Thus, the roles of the SPs 120 are interchangeable, depending on which SP receives the change request 202.

Also, although the illustrated arrangement involves two SPs 120, the same principles may be extended to any number of SPs greater than two. For example, to synchronize N SPs 120 (N>2), each SP includes its own controller, in-memory configuration database, and in-memory intent log. The first SP, which receives the change request 202, behaves similarly to SP 120a as described above, and the Nth SP behaves similarly to SP 120b. The second through (N−1)th SP perform acts similar to those of the second SP 120b, reading the persistent intent log 170 and writing to the in-memory intent log. Only the Nth SP writes the persistent device map 180. Each of the second through (N−1)th SP waits for notification (similar to 8a) of completion from the next SP before writing to its own in-memory configuration database and then acknowledging the previous SP. Once the first SP receives acknowledgement from the second SP, the first SP can acknowledge the change request 202 back to the requestor at (10), completing the update.

Figure 3A:
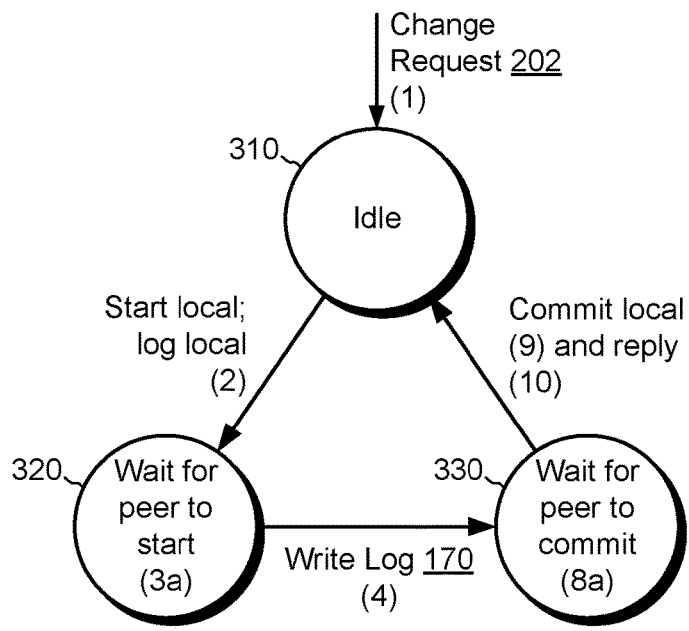
FIGS. 3A and 3B are state transition diagrams showing example state transitions of a first storage processor that receives a request to change RAID configuration metadata (FIG. 3A) and a second storage processor that is synchronized with the first storage processor (FIG. 3B).
Figure 3B:
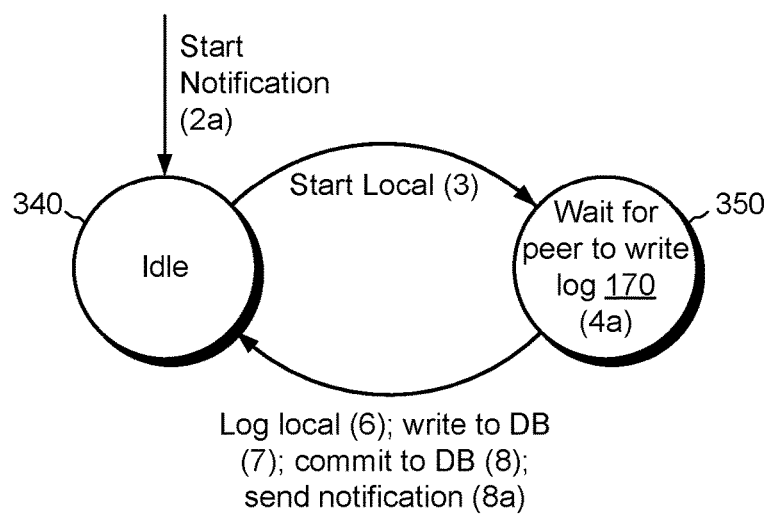

FIGS. 3A and 3B show example state transitions that the controllers 210a and 210b may implement on SP 120a and SP 120b. Each diagram shows respective states (encircled) and respective acts (connecting lines) that trigger transitions from one state to another.

The state transitions of FIG. 3A describe those of a controller that receives a change request 202, which in the case of FIG. 2 is the controller 210a. Here, the controller 210a initially assumes an idle state 310 in which it is waiting for an event to occur. Upon the receipt of change request 202 at the act (1), the controller 210a performs the acts shown by the line connecting state 310 to state 320. For example, the controller 210a performs the act (2) of starting the state machine 140a, initializing variables, etc. The controller also writes the configuration-change record 204 to the local in-memory intent log 230a.

Once the controller 210a has finished performing these acts, the controller 210a assumes state 320, in which it waits for notification that the state machine 140b on SP 120b has started. Such notification arrives during the act (3a) (e.g., via flags 260b). Upon receiving the notification from act (3a), the controller 210a performs the act shown by the line connecting state 320 to state 330, i.e., the act (4) of writing the configuration-change record 202 to the persistent intent log 170.

Once the write is complete, the controller 210a assumes state 330, whereupon the controller 210a waits for a notification that the controller 210b on SP 120b has committed the transaction, at act (8), by writing the configuration-change record 202 to its local in-memory configuration database 220b. Such notification arrives at act (8a) (e.g., via the flags 260b). Upon receiving the notification at act (8a), the controller 210a performs the acts indicated by the arrow connecting state 330 back to state 310. These acts include the act (9) of committing the configuration-change record 202 to its local in-memory configuration database 220a and replying to the change request 202, at act (10). The controller 210a then again assumes the idle state 310, where it may wait to receive another change request 202.

FIG. 3B shows state transitions that are complementary to those of FIG. 3A. During idle state 340, the controller not receiving the change request 202, such as controller 210b in FIG. 2, receives a start notification as a result of act (2a). In response, controller 210b performs act (3), e.g., by starting state machine 140b, initializing variables, etc., and transitions to state 350, whereupon the controller 210b waits for a notification that SP 120a has written to the persistent intent log 170. Upon receiving notification (8a), the controller 210b proceeds to write the configuration-change record 202 to the local in-memory intent log 230b (6), write the configuration-change record 202 to the persistent configuration database 160 (7), commit the configuration-change record 202 to the local in-memory configuration database 220b (8), and send notification (8a). The controller 210b then transitions back to the idle state 340, where it may wait to receive another start notification.

Each SP 120 is preferably programmed to operate according to the state transitions shown in both FIG. 3A and FIG. 3B. Thus, each SP 120 may play the role of responding to change requests 202, as in FIG. 3A, as well as the role of responding to start notifications (2a), as in FIG. 3B.

The synchronization technique as described in connection with FIGS. 1-3 is tolerant to various faults. Such tolerance to faults enables the data storage system to recover from the loss of one SP of both SPs, without loss of RAID configuration data.

Figure 4:
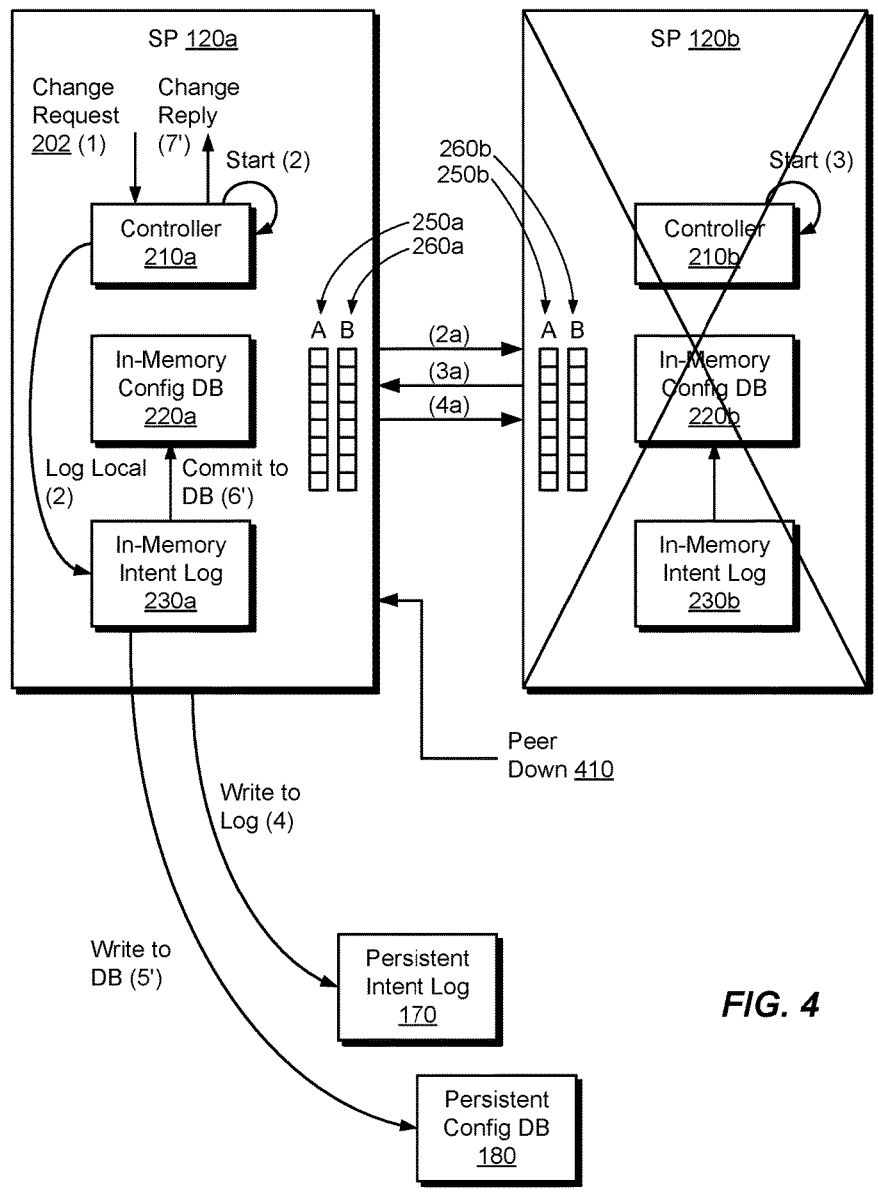
FIG. 4 is a block diagram showing an example fault scenario in which the second storage processor fails while synchronization is in progress.

FIG. 4 shows an example scenario in which SP 120b experiences a fault, such as a loss of power or a system panic, which renders SP 120b inoperative. Here, the fault occurs when the controller 210a in SP 120a is in state 330 (FIG. 3A), i.e., sometime after SP 120a has written the configuration-change record 202 to the persistent intent log 170 at (4) and notified SP 120b at (4a).

While the controller 210a is waiting in state 330, SP 120a receives a peer down notification 410, which indicates that SP 120b is not operating. Rather than stopping or failing the change request 202, controller 210a instead proceeds, at act (5'), to direct SP 120a to write the configuration-change record 202 to the persistent configuration database 180 by itself. At (6'), the controller 210a commits the transaction locally by writing the configuration-change record 202 to its in-memory configuration database 220a. At (7'), the controller 210a acknowledges completion of change request 202. SP 120a is thus able to complete the update even when SP 120b is down.

Similar acts may be performed if SP 120b goes down while controller 210a is in state 320. Here, controller 210a on SP 120a receives the peer down notification 410 and proceeds to perform act (4), by writing to the persistent intent log 170. The controller 210a then performs acts (5'), (6'), and (7') as described above.

Figure 5:
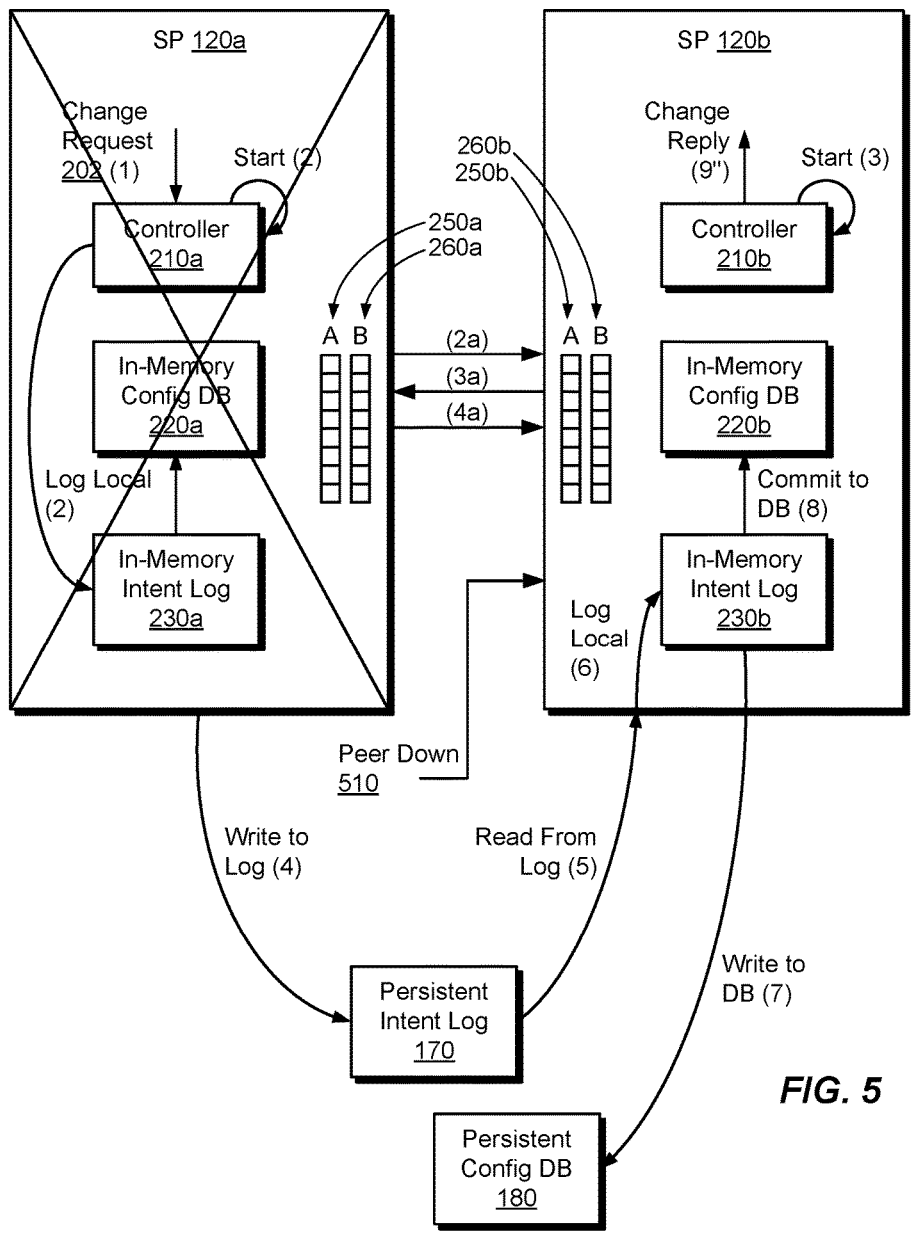
FIG. 5 is a block diagram showing another example fault scenario in which the first storage processor fails while synchronization is in progress.

FIG. 5 shows an example scenario in which SP 120a experiences a fault that renders it inoperative. For this example, it is assumed that the fault occurs after the controller 210b has received a notification (4a) that the SP 120a has written the configuration-change record 202 to the persistent intent log 170, but before the update is completed. In this scenario, controller 210b proceeds as usual to perform acts (5), (6), (7), and (8). But rather than providing a notification (8a) to SP 120a, controller 210b instead issues a change reply at (9''), i.e., a response to the change request 202 received at (1). In this manner, SP 120b is able to complete the update even when SP 120a is down. One should appreciate that issuing the change reply at (9'') may be omitted in some examples. For instance, if the change request at (1) originated from within SP 120a itself, no change reply may be sent, as SP 120a is not able to receive it. In this arrangement, SP 120b merely acts to write the configuration-change record 202, which had been placed in the persistent intent log 170 by SP 120a, to the persistent configuration database 180.

In the case of a fault on either SP 120a or SP 120b, the faulted SP can refresh its own in-memory configuration database 220a or 220b upon rebooting. For example, the rebooted SP reads the persistent configuration database 180 and copies relevant contents into its own in-memory configuration database 220a or 220b. Thus, failure of an SP does not prevent that SP from receiving current RAID configuration metadata once the SP reboots.

Figure 6:
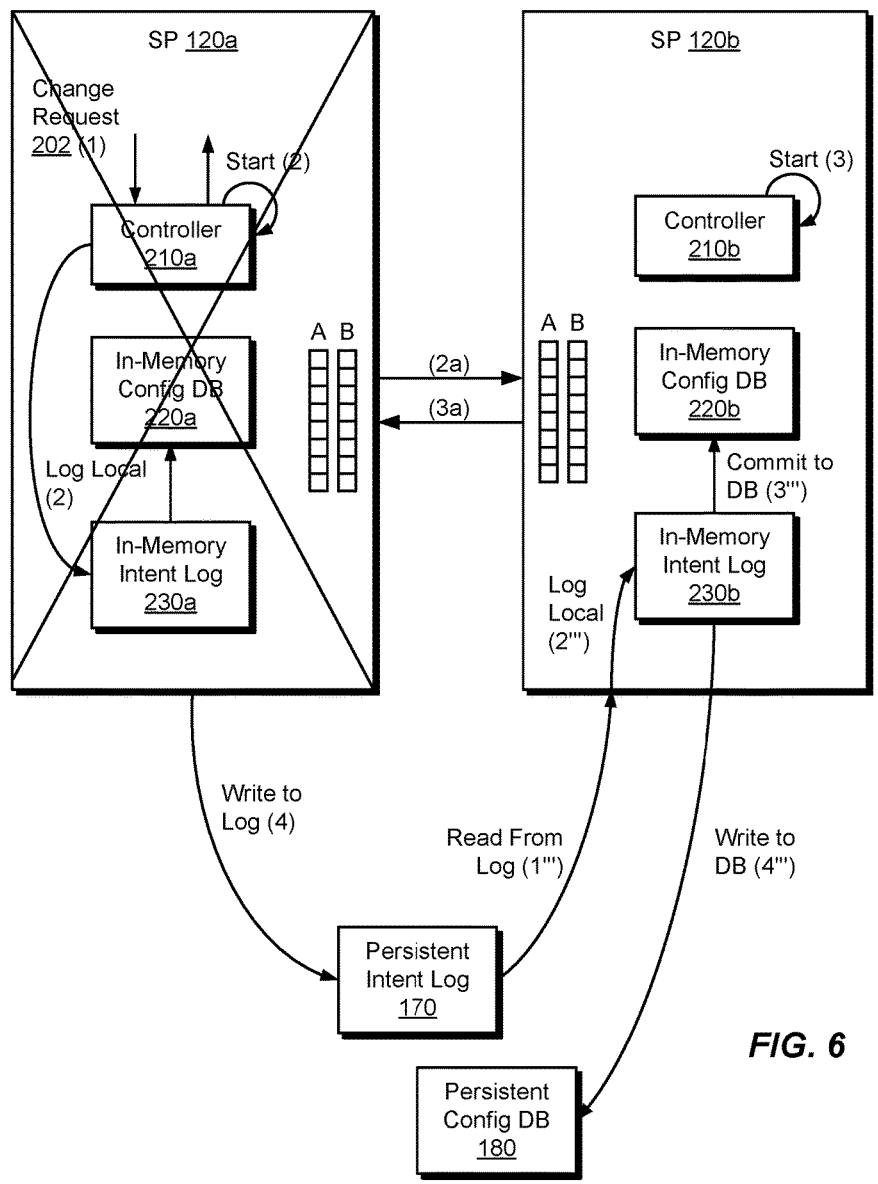
FIG. 6 is a block diagram showing yet another example fault scenario in which both the first storage processor and the second storage processor fail while synchronization is in progress.

FIG. 6 shows yet another fault scenario. Here, both SPs 120a and 120b become inoperative sometime after an update has started, such as when the controller 210a on SP 120a is in state 330. The update can still proceed as long as the configuration-change record 202 has been written to the persistent intent log 170. The first SP to reboot (SP 120b in this example) reads the persistent intent log 170 at (1'''), writes any pending transactions at (2''') to the local in-memory intent log 230b, writes the transactions at (3''') to the in-memory configuration database 220b, and syncs the contents at (4''') to the persistent device map 180. SP 120a may perform similar acts when it reboots, although no pending transactions will typically remain in the persistent intent log 170.

Figure 7:
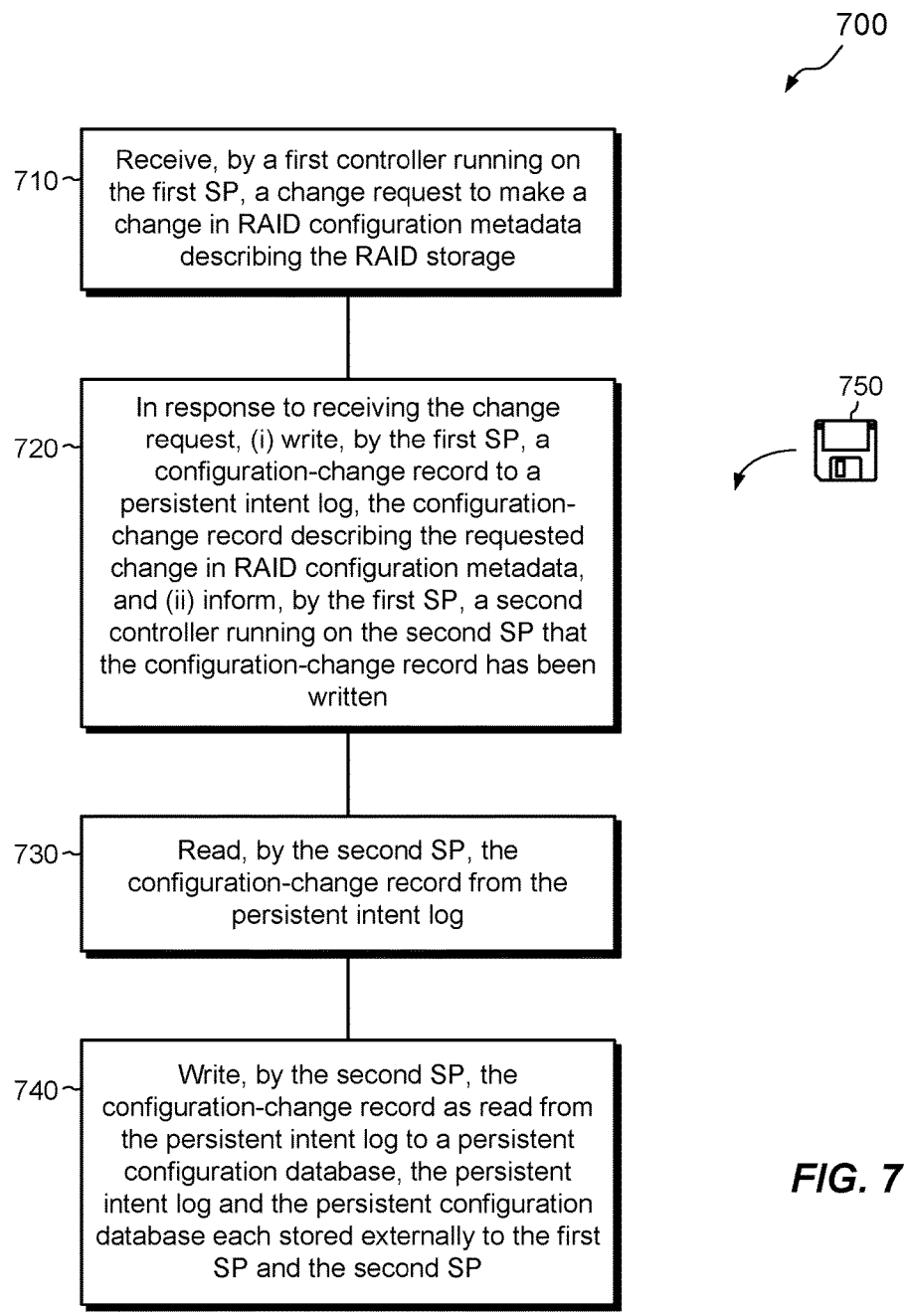
FIG. 7 is a flow chart showing an example method of maintaining RAID configuration metadata across multiple storage processors.

FIG. 7 shows an example method 700 that may be carried out in connection with the environment 100. The method 700 is typically performed, for example, by the software constructs described in connection with FIGS. 1 and 2, which reside in the memories 130a and 130b of the storage processors 120a and 120b and are run by the sets of processing units 124a and 124b. The various acts of method 700 may be ordered in any suitable way. Accordingly, embodiments may be constructed in which acts are performed in orders different from that illustrated, which may include performing some acts simultaneously.

At 710, a first controller 210a running on the first SP 120a receives a change request 202 to make a change in RAID configuration metadata describing the RAID storage 150.

At 720, in response to receiving the change request 202, the method 700 further includes (i) writing, by the first SP 120a, a configuration-change record 204 to a persistent intent log 170, the configuration-change record 204 describing the requested change in RAID configuration metadata, and (ii) informing, by the first SP 120a, a second controller 210b running on the second SP 120b that the configuration-change record 204 has been written.

At 730, the second SP 120b reads the configuration-change record 204 from the persistent intent log 170.

At 740, the second SP 120b writes the configuration-change record 204 as read from the persistent intent log 170 to the persistent configuration database 180, the persistent intent log 170 and the persistent configuration database 180 each stored externally to the first SP 120a and the second SP 120b.

An improved technique has been described for maintaining consistency in RAID configuration metadata across different storage processors in a data storage system. The technique enables active-active-configured storage processors to correctly map IO requests to disk drives in RAID storage even as RAID configurations change. The technique also distributes RAID configuration metadata among different disk drives to promote scalability and redundancy in the storage of such metadata.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (secure digital) chip or device, application specific integrated circuit (ASIC), field programmable gate array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of maintaining configuration data describing RAID (redundant array of independent disks) storage across first and second SPs (storage processors) coupled to the RAID storage, the method comprising:
    receiving, by a first controller running on the first SP, a change request to make a change in RAID configuration metadata describing the RAID storage;
    in response to receiving the change request, (i) writing, by the first SP, a configuration-change record to a persistent intent log, the configuration-change record describing the requested change in RAID configuration metadata, and (ii) informing, by the first SP, a second controller running on the second SP that the configuration-change record has been written;
    reading, by the second SP, the configuration-change record from the persistent intent log; and
    writing, by the second SP, the configuration-change record as read from the persistent intent log to a persistent configuration database, the persistent intent log and the persistent configuration database each stored externally to the first SP and the second SP.

2. The method of claim 1, wherein the RAID storage includes multiple disk drives, and wherein the persistent intent log and the persistent configuration database are each stored among the multiple disk drives of the RAID storage.

3. The method of claim 2, wherein the multiple disk drives each include a first region reserved for system metadata and a second region for storing host data, and wherein the persistent intent log and the persistent configuration database are stored in the regions reserved for system metadata.

4. The method of claim 2, further comprising:
    storing, on each of the first SP and the second SP, a respective in-memory intent log;
    in response to receiving the change request, writing, by the first controller, the configuration-change record to the in-memory intent log of the first SP; and
    after reading, by the second SP, the configuration-change record from the persistent intent log, writing, by the second controller, the configuration-change record to the in-memory intent log of the second SP.

5. The method of claim 4, further comprising:
    storing, on each of the first SP and the second SP, a respective in-memory configuration database;
    after writing, by the second SP, the configuration-change record as read from the persistent intent log to the persistent configuration database, writing, by the second controller, the configuration-change record to the in-memory configuration database of the second SP; and
    in response to receiving a message from the second SP that the configuration-change record has been written to the in-memory configuration database of the second SP, writing, by the first controller, the configuration-change record to the in-memory configuration database of the first SP.

6. The method of claim 5, wherein the first SP and the second SP each store (i) a first set of flags that indicates actions completed by the first SP in responding to the change request and (ii) a second set of flags that indicates actions completed by the second SP in responding to the change request.

7. The method of claim 6, wherein informing, by the first SP, the second controller running on the second SP that the persistent intent log has been changed includes sending the first set of flags to the second SP.

8. The method of claim 7, wherein receiving the message from the second SP includes receiving, by the first SP, the second set of flags from the second SP.

9. The method of claim 5, further comprising:
    receiving, by the first controller, a second change request to make a change in RAID configuration metadata;
    in response to receiving the second change request, (i) writing, by the first SP, a second configuration-change record to the persistent intent log and (ii) informing, by the first SP, the second controller that the second configuration-change record has been written to the persistent intent log;
    receiving, by the first SP, a notification that the second SP is down; and
    in response to receiving the notification that the second SP is down, writing, by the first SP, the second configuration-change record to the persistent configuration database.

10. The method of claim 5, further comprising:
    receiving, by the first controller, a third change request to make a change in RAID configuration metadata;
    in response to receiving the third change request, (i) writing, by the first SP, a third configuration-change record to the persistent intent log and (ii) informing, by the first SP, the second controller that the third configuration-change record has been written to the persistent intent log;
    receiving, by the second SP, a notification that the first SP is down; and
    in response to receiving the notification that the first SP is down, writing, by the second SP, the third configuration-change record to the persistent configuration database.

11. The method of claim 5, further comprising:
    receiving, by the first controller, a fourth change request to make a change in RAID configuration metadata;
    in response to receiving the fourth change request, (i) writing, by the first SP, a fourth configuration-change record to the persistent intent log and (ii) informing, by the first SP, the second controller that the fourth configuration-change record has been written to the persistent intent log; and in response to both the first SP and the second SP going down and after one of the first SP and the second SP has rebooted, synchronizing, by the rebooted SP, the fourth configuration-change record stored in the persistent intent log to the persistent configuration database.

12. A data storage system, comprising a first SP (storage processor) and a second SP coupled to RAID (redundant array of independent disks) storage, the data storage system constructed and arranged to:
   receive, by a first controller running on the first SP, a change request to make a change in RAID configuration metadata describing the RAID storage;
   in response to receiving the change request, (i) write, by the first SP, a configuration-change record to a persistent intent log, the configuration-change record describing the requested change in RAID configuration metadata, and (ii) inform, by the first SP, a second controller running on the second SP that the configuration-change record has been written;
   read, by the second SP, the configuration-change record from the persistent intent log; and
   write, by the second SP, the configuration-change record as read from the persistent intent log to a persistent configuration database, the persistent intent log and the persistent configuration database each stored externally to the first SP and the second SP.

13. A computer program product including a set of non-transitory, computer-readable media having instructions which, when executed by first and second SPs (storage processors) of a data storage system, cause the SPs to perform a method of maintaining configuration data across the first and second SPs, the method comprising:
   receiving, by a first controller running on the first SP, a change request to make a change in RAID (redundant array of independent disks) configuration metadata describing RAID storage;
   in response to receiving the change request, (i) writing, by the first SP, a configuration-change record to a persistent intent log, the configuration-change record describing the requested change in RAID configuration metadata, and (ii) informing, by the first SP, a second controller running on the second SP that the configuration-change record has been written;
   reading, by the second SP, the configuration-change record from the persistent intent log; and
   writing, by the second SP, the configuration-change record as read from the persistent intent log to a persistent configuration database, the persistent intent log and the persistent configuration database each stored externally to the first SP and the second SP.

14. The computer program product of claim 13, wherein the method further comprises:
   storing, on each of the first SP and the second SP, a respective in-memory intent log;
   in response to receiving the change request, writing, by the first controller, the configuration-change record to the in-memory intent log of the first SP; and
   after reading, by the second SP, the configuration-change record from the persistent intent log, writing, by the second controller, the configuration-change record to the in-memory intent log of the second SP.

15. The computer program product of claim 14, wherein the method further comprises:
   storing, on each of the first SP and the second SP, a respective in-memory configuration database;
   after writing, by the second SP, the configuration-change record as read from the persistent intent log to the persistent configuration database, writing, by the second controller, the configuration-change record to the in-memory configuration database of the second SP; and
   in response to receiving a message from the second SP that the configuration-change record has been written to the in-memory configuration database of the second SP, writing, by the first controller, the configuration-change record to the in-memory configuration database of the first SP.

16. The computer program product of claim 15, wherein the first SP and the second SP each store (i) a first set of flags that indicates actions completed by the first SP in responding to the change request and (ii) a second set of flags that indicates actions completed by the second SP in responding to the change request.

17. The computer program product of claim 16, wherein informing, by the first SP, the second controller running on the second SP that the persistent intent log has been changed includes sending the first set of flags to the second SP.

18. The computer program product of claim 17, wherein receiving the message from the second SP includes receiving, by the first SP, the second set of flags from the second SP.

19. The computer program product of claim 15, wherein the method further comprises:
   receiving, by the first controller, a second change request to make a change in RAID configuration metadata;
   in response to receiving the second change request, (i) writing, by the first SP, a second configuration-change record to the persistent intent log and (ii) informing, by the first SP, the second controller that the second configuration-change record has been written to the persistent intent log;
   receiving, by the first SP, a notification that the second SP is down; and
   in response to receiving the notification that the second SP is down, writing, by the first SP, the second configuration-change record to the persistent configuration database.

20. The computer program product of claim 15, wherein the method further comprises:
   receiving, by the first controller, a third change request to make a change in RAID configuration metadata;
   in response to receiving the third change request, (i) writing, by the first SP, a third configuration-change record to the persistent intent log and (ii) informing, by the first SP, the second controller that the third configuration-change record has been written to the persistent intent log;
   receiving, by the second SP, a notification that the first SP is down; and
   in response to receiving the notification that the first SP is down, writing, by the second SP, the third configuration-change record to the persistent configuration database.

* * * * *